(12) United States Patent
Thill et al.

(10) Patent No.: US 8,708,232 B2
(45) Date of Patent: Apr. 29, 2014

(54) BANK CARD WITH DISPLAY SCREEN

(75) Inventors: Michel Thill, Les Clayes-sous-Bois (FR); Pierre Gravez, Nogent sur Marne (FR); Francois-Xavier Marseille, Marly le Roi (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/701,883

(22) PCT Filed: Jun. 1, 2011

(86) PCT No.: PCT/EP2011/059021
§ 371 (c)(1),
(2), (4) Date: Dec. 4, 2012

(87) PCT Pub. No.: WO2011/151366
PCT Pub. Date: Dec. 8, 2011

(65) Prior Publication Data
US 2013/0068845 A1   Mar. 21, 2013

(30) Foreign Application Priority Data
Jun. 4, 2010  (EP) .................... 10305592

(51) Int. Cl.
*G06K 19/06* (2006.01)
(52) U.S. Cl.
USPC .......................................... 235/380; 235/492
(58) Field of Classification Search
USPC ................................ 235/492, 380
See application file for complete search history.

(56) References Cited

U.S. PATENT DOCUMENTS

| 6,168,083 | B1 | 1/2001 | Berger et al. |
| 6,776,332 | B2 * | 8/2004 | Allen et al. .................... 235/380 |
| 7,762,471 | B2 | 7/2010 | Tanner |
| 2002/0179707 | A1 | 12/2002 | Omet |
| 2004/0124246 | A1 * | 7/2004 | Allen et al. .................... 235/492 |
| 2005/0247777 | A1 | 11/2005 | Pitroda |
| 2007/0290049 | A1 | 12/2007 | Ratcliffe |
| 2008/0093452 | A1 | 4/2008 | Will et al. |

(Continued)

FOREIGN PATENT DOCUMENTS

| FR | 2725084 A1 | 3/1996 |
| WO | WO0201496 A1 | 1/2002 |

(Continued)

OTHER PUBLICATIONS

PCT/EP2011/059021 International Search Report, Sep. 12, 2011, European Patent Office, P.B. 5818 Patentlaan 2 NL—2280 HV Rijswijk.

(Continued)

*Primary Examiner* — Christle I Marshall
(74) *Attorney, Agent, or Firm* — The Jansson Firm; Pehr B. Jansson

(57) ABSTRACT

To allow the display of the latest transactions completed, a smart card 100*c* comprises at least one secure chip 101*c* with at least one communication interface in order to communicate with a card reader in order to carry out a transaction. The card further comprises an electronic display 103, an independent battery 104, and an interception circuit 150*c* connected to the at least one communication interface of the secure chip in order to be able to intercept at least one type of command and save at least one piece of information so as to be able to display it on the display.

13 Claims, 2 Drawing Sheets

(56) References Cited

U.S. PATENT DOCUMENTS

| | | |
|---|---|---|
| 2008/0105751 A1* | 5/2008 | Landau .................. 235/492 |
| 2009/0240625 A1 | 9/2009 | Faith et al. |
| 2010/0224685 A1 | 9/2010 | Aoki |
| 2011/0140841 A1 | 6/2011 | Bona et al. |

FOREIGN PATENT DOCUMENTS

| | | |
|---|---|---|
| WO | WO2008104567 A1 | 9/2008 |
| WO | WO2010022129 A1 | 2/2010 |
| WO | WO2011151309 A1 | 12/2011 |

OTHER PUBLICATIONS

PCT/EP2011/058914 International Search Report, Jun. 21, 2011, European Patent Office, P.B. 5818 Patentlaan 2, NL—2280 HV Rijswijk.

* cited by examiner

BANK CARD WITH DISPLAY SCREEN

BACKGROUND OF THE INVENTION

The invention relates to a bank card with a display screen.

Bank cards have electronic chips for transaction security. The EMV standard was created by Europay, MasterCard and Visa, the initials of which relate to the definition of an interoperability and security standard between smart bank cards. For a card to have EMV certification, it must have a chip, which is itself certified and has a contact type interface according to the standard ISO 7816 and/or a contactless interface according to the standard ISO 14443. To limit the risks of hacking, EMV chips do not have any other communication interface.

Besides, the making of smart cards with a screen and one or more pushbuttons to communicate with the cardholder is also known. These cards are not currently widespread and are used for generating single-use passwords for computer transactions. Such cards generally have a chip with a contact or contactless smart card communication interface and a communication port designed for communication with other integrated circuits such as for example an I2C communication interface or General Purpose Input/Output (GPIO) ports. It is thus possible for a smart card microcontroller to communicate with a display controller that controls a liquid crystal display or a so-called "electronic ink" display.

One idea would be to make a bank card with a screen to display the latest transactions completed. That raises a problem if the smart card is to be made according to the EMV standard. These chips do not have an additional input/output port for such an application, and for security reasons, the addition of other input/output ports is not preferable.

As a result, it is not possible to control the display from an EMV chip. A solution is thus required to be able to display the latest transactions completed on a smart card.

SUMMARY

The invention is a solution to the problem posed. To allow the display of the latest transactions, a second microcontroller is added to the smart card in order to provide a function to intercept and store transaction information.

More particularly, the invention is a smart card for secure transactions, comprising at least one secure chip with a communication interface to communicate with a card reader in order to carry out a transaction, characterised in that the card further comprises an electronic display, an independent battery, an interception circuit connected to the communication interface of the secure chip in order to intercept at least one type of command and save at least one piece of information to be able to display it on the display.

Preferentially, the interception circuit stores information exchanged in clear form between the secure chip and the card reader. The intercepted information may be the amount of a completed transaction.

In different embodiments, the card may comprise an actuator to allow a holder of the said card to display the intercepted information. The actuator may be a motion sensor. The actuator may be a pushbutton that is used to power up the display and the interception circuit using the independent battery, wherein a timer switches off the power supply. The card may also comprise a usage sensor to disable or enable the working of the interception circuit. The usage sensor is for example a light sensor.

According to different alternative implementations, the communication interface may be a contact type interface wherein the interception circuit is connected in parallel to the contacts of the card and/or a contactless interface with a first antenna formed of turns inside the card and wherein the interception circuit has a second antenna formed of turns inside the card, the first and the second antenna sharing a common electromagnetic flux. If the secure chip has two communication interfaces, then the interception circuit is connected to the two interfaces.

BRIEF DESCRIPTION OF THE DRAWINGS

The invention will be better understood and other particularities and benefits will become clear in the description below, which refers to the attached drawings, among which

DETAILED DESCRIPTION

Figure 1:
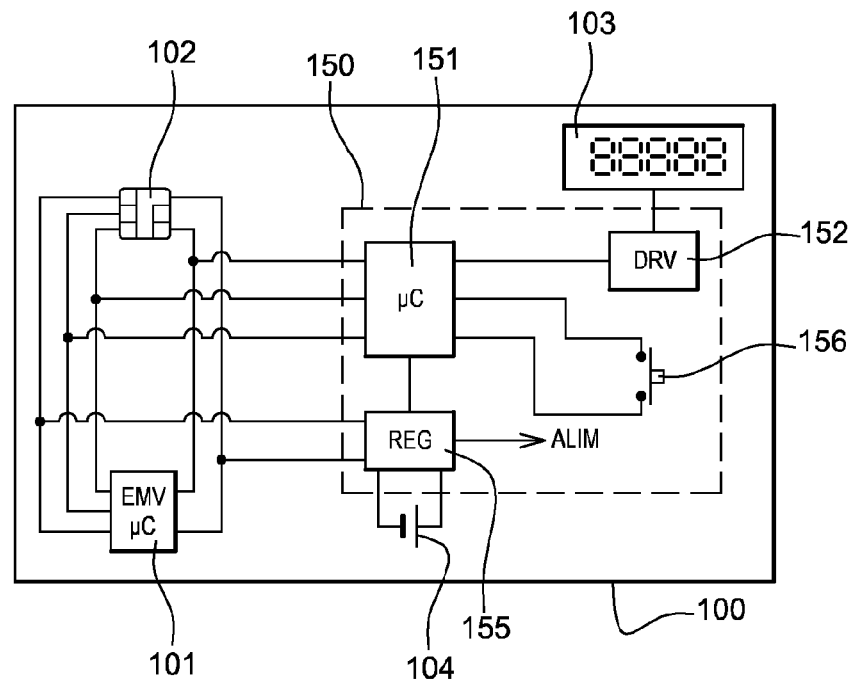
FIGS. 1 to 3 represent three embodiments of the invention.

FIG. 1 is a functional diagram of a first embodiment of the invention. In this embodiment, the bank card 100 is a contact type smart card comprising a secure chip 101 with a communication interface in accordance with the standard ISO 7816 connected to a connector 102 comprising contact pads that are also defined by the standard 7816. The secure chip 101 is for example a chip that meets the EMV standard and comprises restricted-access data and other so-called public data. The restricted-access data require the use of a password or encrypted messages whereas public data may be accessed for reading and/or writing by any reader that complies with the standard ISO 7816.

During a payment that uses the secure chip 101, the bank card 100 is inserted in a secure reader which verifies a PIN number entered by the holder of the card to verify that the card holder is the right one, followed by the exchange of secure information via encrypted messages between the card, the reader and possibly a remote server to verify if the card debit is or is not authorised. When the transaction is completed, the information is updated in the card and the reader to indicate the amount of the transaction completed and possibly the balance remaining in the card. The completed transaction amounts that are stored in the card have no legal value and do not contain confidential information, and are thus generally saved in a non-secure memory zone, which is thus accessible by any type of reader that complies with the standard ISO 7816. These data are not sensitive data and can thus be exchanged in clear form with identifiable writing commands.

In order to display the latest transactions completed, the bank card 100 has an electronic display 103, a battery 104 and a command interception circuit 150. The interception circuit 150 may be made of a single integrated circuit or possibly several circuits. In terms of manufacturing, the interception circuit 150 may be laminated on a substrate in the card body using a known method with contact with the rear side of the contact pads of the connector 102 according to a known technique.

The electronic display 103 may be of the liquid crystal type or the electronic-ink type using micro-balls. What matters is that the display 103 must be sufficiently fine to be integrated into a smart card and must also have low power requirements. The battery 104 is an ultra-flat battery that can be integrated into a smart card. Depending on the required life of the card and the consumption of the interception circuit 150 and the display 103, a rechargeable or non-rechargeable battery may be chosen.

The interception circuit 150 comprises a microcontroller 151 constituting the intelligence of the device and comprising the programs required for the working of the whole, a control circuit 152 to control the electronic display 103, a power supply regulator 155 and a pushbutton 156.

The microcontroller 151 is the main control component of the interception circuit. The control circuit 152 is used for transforming a number to write supplied by the microcontroller 151 into electronic signals to control the electronic display 103. The power supply regulator 155 is used for transforming the voltage supplied by the battery into power voltage for the display 103 and the interception circuit 150. The power supply regulator 155 may also act as a battery charger if the battery 104 is of the rechargeable type. The battery is recharged when the card is connected to an external reader during a transaction.

The microcontroller 151 is connected to the contact pads of the connector 102 so as to be able to read all the message exchanged between the secure chip 101 and a card reader. During a transaction between the card 100 and a reader, for example of the payment terminal type, the microcontroller receives all the commands exchanged and all the data that go through the connector 102. When the microcontroller 151 detects a command that corresponds with the writing of the amount of the transaction in the secure chip 101, the microcontroller 151 stores the information in a non-volatile manner.

The pushbutton 156 is an actuator accessible by the card holder to trigger the display of the latest transactions. When the pushbutton 156 is pressed, the microcontroller 151 wakes up the interception circuit. The microcontroller 151 then reads the last transaction saved by it and sends a control sequence to the control circuit 152 to display the amount on the display 103.

Pressing the pushbutton 156 once again can lead to the readout and display of the previous transaction that has been stored. Keeping the button pressed down can stop the reading of transactions and switch to standby mode, where the power supply of the secure chip 101, the display 103, the interface 153 and the control circuit is switched off and where only the microcontroller 151 is powered for the part allowing the device to wake up when the pushbutton is pressed once again. If the pushbutton 156 is not pressed for a predefined long time, such as for example 1 to 2 minutes, that can also put the system into standby.

As an alternative, in order to save as much battery power as possible, using the pushbutton may power up the card components by the contact made directly by the pushbutton to control an electronic switch. The benefit of such as system is that a timer, for example of one or two minutes, may be used to switch off the electronic switch and switch off the current in the card completely.

Figure 2:
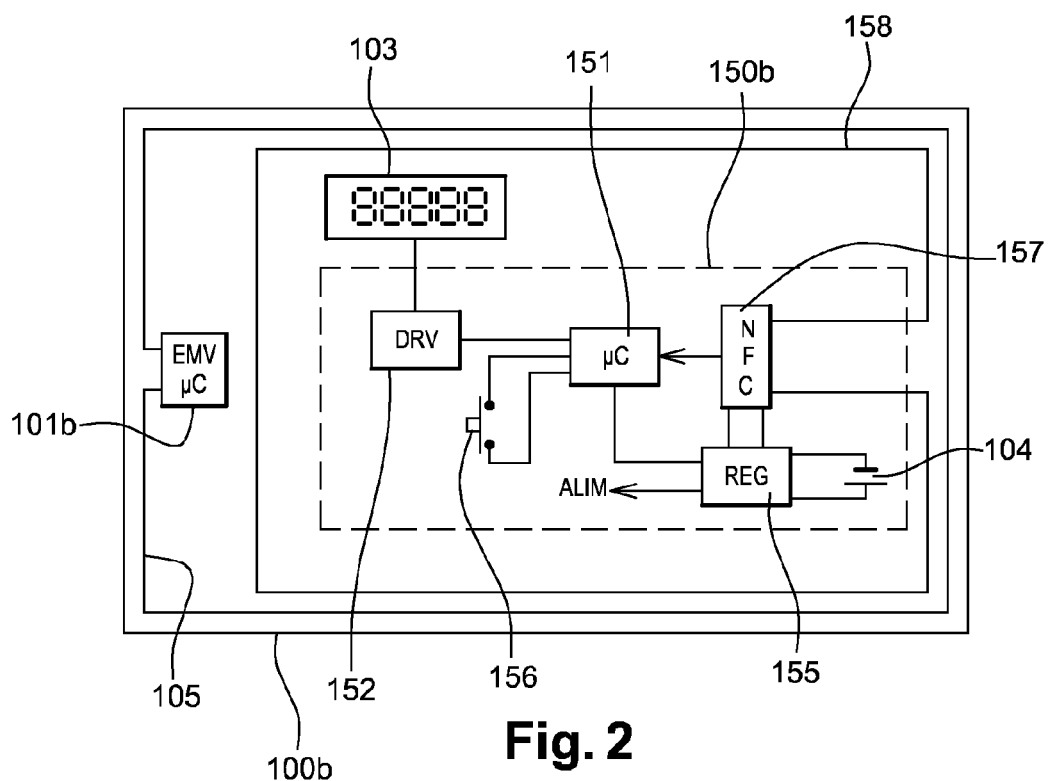

FIG. 2 is a functional chart of a second embodiment of the invention. In order to simplify the description, the components that are shared between the first and second embodiments have the same references and will not be described further. Also, the equivalent components will have a reference that also refers to the first embodiment by adding a 'b'.

In this second embodiment, the bank card 100b is a contactless type smart card comprising a secure chip 101b with a communication interface in accordance with the standard ISO 14443 connected to an antenna 105 made up of turns placed inside the card body. The secure chip 101b is for example a chip that meets the EMV standard and comprises restricted-access data and other so-called public data. The restricted-access data require the use of passwords or encrypted messages whereas public data may be accessed for reading and/or writing by any reader that complies with the standard ISO 14443.

During a payment that uses the secure chip 101b, the bank card 100b is placed before the antenna of a secure reader and secure information is exchanged via encrypted messages between the card, the reader and possibly a remote server to verify if the card debit is or is not authorised. When the transaction is completed, the information is updated in the card and the reader to indicate the amount of the transaction completed and possibly the balance remaining in the card. The completed transaction amounts that are stored in the card have no legal value and do not contain confidential information, and are thus generally saved in a non-secure memory zone, which is thus accessible by any type of reader that complies with the standard ISO 14443. Further, the command that indicates the writing of the amount of the transaction is also sent in clear form.

In order to display the latest transactions completed, the bank card 100b has an electronic display 103, a battery 104 and an interception circuit 150b. The interception circuit 150b differs from the first embodiment in that it uses a communication interface 157 that complies with the standard ISO 14443 and is connected to an antenna 158. The antenna 158 is an antenna made up of several turns and is also placed inside the card body. The antennas 105 and 158 are made so as to share common electromagnetic flux so that the antenna receives all the data received and emitted by the secure chip 101b. These two antennas are further configured to not disturb each other when they share the electromagnetic flux of a reader located outside the card.

The interface 157 also makes it possible to recover energy from an external reader in order to make it possible to recharge the battery 104 by means of a power supply regulator 155. When the interface 157 detects an external field created by a card reader, the interface 157 indicates that to the microcontroller 151, which wakes up the interception circuit 150b. The microcontroller 151 is programmed to listen to data exchanges, but is not configured to be signalled automatically when the field is detected. That means that a transaction can be completed between the secure chip 101b and the card reader without the interception circuit 150b disturbing the exchange of information. When the microcontroller 151 detects a command that corresponds with the writing of the amount of the transaction in the secure chip 101b, the microcontroller 151 stores the information in a non-volatile manner.

When the pushbutton 156 is pressed later on, the transaction information is displayed as indicated by reference to FIG. 1.

Figure 3:
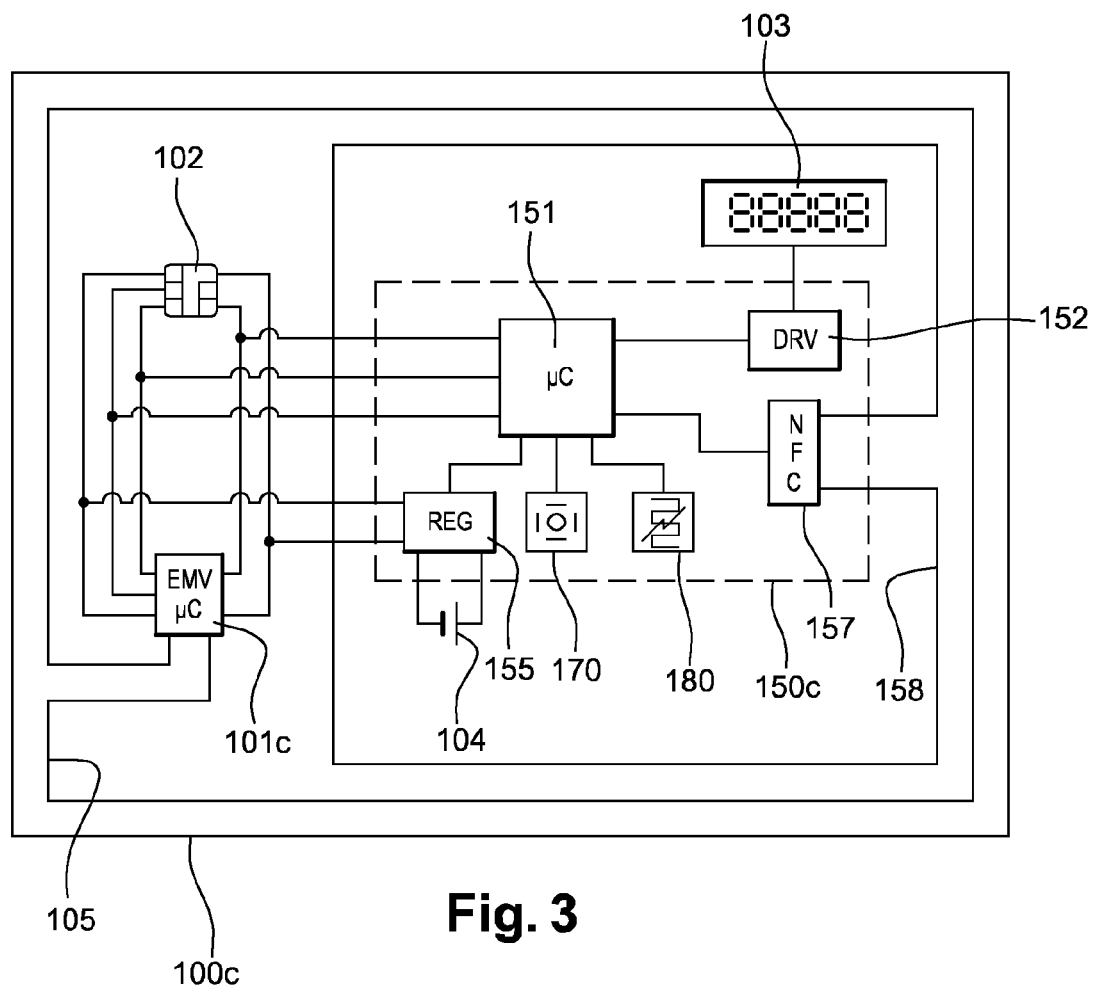

FIG. 3 represents a functional diagram of a third embodiment of the invention, which further incorporates improvements that can also be used in combination with one of the embodiments described above. In order to simplify the description, the components that are shared between the second and third embodiments have the same references and will not be described further. Also, the equivalent components will have a reference that also refers to the other embodiments by adding a 'c'.

In this third embodiment, the bank card 100c is a hybrid smart card comprising a secure chip 101c with a communication interface in accordance with the standard ISO 7816 connected to a connector 102 comprising contact pads that are also defined by the standard 7816 and also a communication interface in accordance with the standard ISO 14443 connected to an antenna 105 made up of turns placed inside the card body. The secure chip 101c is for example a chip that meets the EMV standard and comprises restricted-access data and other so-called public data. The restricted-access data require the use of a password or encrypted messages whereas public data may be accessed for reading and/or writing by any reader that complies with the standard ISO 7816 or the standard ISO 14443. Regardless of the communication used, wired or wireless, transaction data are sent by means of the write command in clear form, that is unencrypted.

In order to display the latest transactions completed, the bank card 100c has an electronic display 103, a battery 104 and an interception circuit 150c. The interception circuit 150c differs from the two previous embodiments in that it simultaneously uses a connection of the microcontroller 151 with the contact pads of the connector 102, and a communication interface 157 that complies with the standard ISO 14443 and is connected to an antenna 158.

Among the other changes, the pushbutton 156 is replaced by an accelerometer 170 in order to avoid problems relating to wear and tear and loose contacts associated with pushbuttons, which are particularly sensitive on smart cards. Thus the interception circuit and the display can be powered up in a movement to display a transaction. Movement signatures can be used to differentiate if a particular type of transaction is to be viewed, such as for example the previous or next transaction.

Also, the use of a pushbutton or even an accelerometer can start up the power supply of the interception circuit 150c and the display 103 when the card is already in a reader or in a pocket. That type of triggering could lead to early battery discharging. In order to remedy possible problems, a light sensor 180 is used and coupled with the microcontroller 151 to disable working if the sensor does not sense sufficient light.

The invention claimed is:

1. A smart card for secure transactions comprising:
    at least one secure chip with a communication interface in order to communicate with a card reader so as to carry out a transaction during which at least one write command is sent from the card reader to the card;
    an electronic display;
    an independent battery; and
    an interception circuit connected to the communication interface of the secure chip in order to be able to intercept the at least one write command and save at least one piece of information transmitted by said write command so as to be able to display it on the display.

2. A card according to claim 1, wherein the interception circuit stores information exchanged in clear form between the secure chip and the card reader.

3. A card according to claim 2, wherein the intercepted information is the amount of a completed transaction.

4. A card according to claim 1, wherein the card comprises an actuator to allow a holder of the said card to display the intercepted information.

5. A card according to claim 4, wherein the actuator is a motion sensor.

6. A card according to claim 4, wherein the actuator is a pushbutton that is used to power up the display and the interception circuit using the independent battery, and wherein a timer switches off the power supply.

7. A card according to claim 1, wherein the card comprises a usage sensor to inhibit or enable the working of the interception circuit.

8. A card according to claim 7, wherein the usage sensor is a light sensor.

9. A card according to claim 1, wherein the communication interface is a contact type interface and wherein the interception circuit is connected in parallel to the contacts of the card.

10. A card according to claim 1, wherein the communication interface is a contactless interface with a first antenna formed of turns inside the card and wherein the interception circuit has a second antenna formed of turns inside the card, the first and the second antenna sharing a common electromagnetic flux.

11. A card according to claim 1, wherein the secure chip has two communication interfaces, and wherein the interception circuit is connected to the two interfaces.

12. The smart card for secure transactions according to claim 1 wherein the interception circuit comprises:
    a microcontroller connected in parallel to the communication interface and operable to intercept the write command and to save the at least one piece of information; and
    an actuator connected to the microcontroller and operable to signal the microcontroller to display the saved at least one piece of information on the display.

13. The smart card for secure transactions according to claim 12 wherein the actuator is a button and wherein the microcontroller interprets a first press of the button to cause the display of the most recent transaction and subsequent presses to display prior transactions.

* * * * *